July 10, 1951

J. W. PECKHAM 2,559,789

DILATOMETER

Filed June 27, 1944

INVENTOR.
JOSEPH W PECKHAM
BY
E. C. SANBORN

Patented July 10, 1951

2,559,789

UNITED STATES PATENT OFFICE 2,559,789

DILATOMETER

Joseph W. Peckham, Cheshire, Conn., assignor to The Bristol Company, Waterbury, Conn., a corporation of Connecticut Application June 27, 1944, Serial No. 542,349

6 Claims. (Cl. 73—16)

This invention relates to dilatometers, and more especially to an instrument for the purpose of providing a continuous graphic record of the temperature-expansion characteristics of solid specimens, and including a device for compensating for expansion of parts of the instrument due to heat transmitted between the specimen-temperature-affecting element and said parts.

Prior dilatometer apparatus of a well-known type embodies a furnace for heating a specimen between a normally fixed and a normally movable abutment, together with a mechanical linkwork which rotates a circular chart in accord with changes in the linear spacing between said abutments. A relay-type pyrometer mechanism responsive to a thermocouple embedded in the specimen moves a recording pen in a sense generally radially of said chart. There is thus provided a graph of linear expansion with reference to temperature change and taking the form of a diagram on the chart, subject to interpretation in terms of the characteristics of the specimen, whereby there may be determined important data with respect to its properties, including transformation points and other phenomena attending changes in temperature of the material composing the specimen. An example of a dilatometer embodying the above principles is found in U. S. Letters Patent No. 2,287,008, granted to S. P. Rockwell, June 16, 1942.

An improvement over the conventional form of dilatometer is shown in the co-pending application Serial No. 486,678, filed May 12, 1943, by C. F. Wetherbee, now Patent No. 2,380,565, dated July 31, 1945, wherein is shown such an instrument providing compensation for changes in dimensions of the mechanism or other elements whose expansion is not a function of the magnitude under measurement, and also expressing the final measurement in the form of a diagram on a scale having rectangular coordinates. In the device set forth in said Wetherbee application, the dimensional changes in the specimen under investigation are determined by means of a linkwork including a differential lever whereby compensation is effected for dimensional changes which it is not desired to include in the final measurement. While this apparatus is effective in its performance and can be made to provide records of great precision and accuracy, its satisfactory operation demands that the specimen under test be subjected to appreciable mechanical pressure. Moreover, because of the plurality of linked elements comprising the mechanical train of the measuring system, care must be exercised to eliminate the effects of possible friction between coacting parts.

It is an object of the present invention to provide a dilatometer which shall produce a measurement of dimensional change in a specimen, inherently free from the effects of variation in any dimension of the supporting or other associated elements.

It is a further object to provide an instrument of the above class, in which said measurement shall be produced without the necessity of interposition of a complete mechanical linkage between the measured specimen and the exhibiting element.

In carrying out the purposes of the invention, it is proposed to provide a dilatometer in which the mounting and the heating of the specimen under test, as well as the method of continuous determination of its temperature, shall be in agreement with conventional methods, but in which the expansion or other dimensional changes in the specimen with variations of the conditions to which it is exposed shall be determined by means of a control couple forming a part of a measuring system and having two coacting elements, one of which is movable with all displacements of the free extremity of the specimen, and the other of which partakes of all unavoidable displacements which it is desired to eliminate by compensation. The measuring system, preferably in the form of an electronic network, being made responsive to the difference only in displacement of said elements, there is obtained an effect which may be translated into a quantitative measure of the deformation or extension of the specimen.

Figure 2:
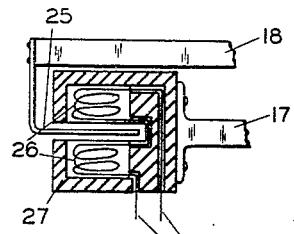
Fig. 2 is a top elevation, partly in section of an element of the apparatus shown in Fig. 1.
Figure 1:
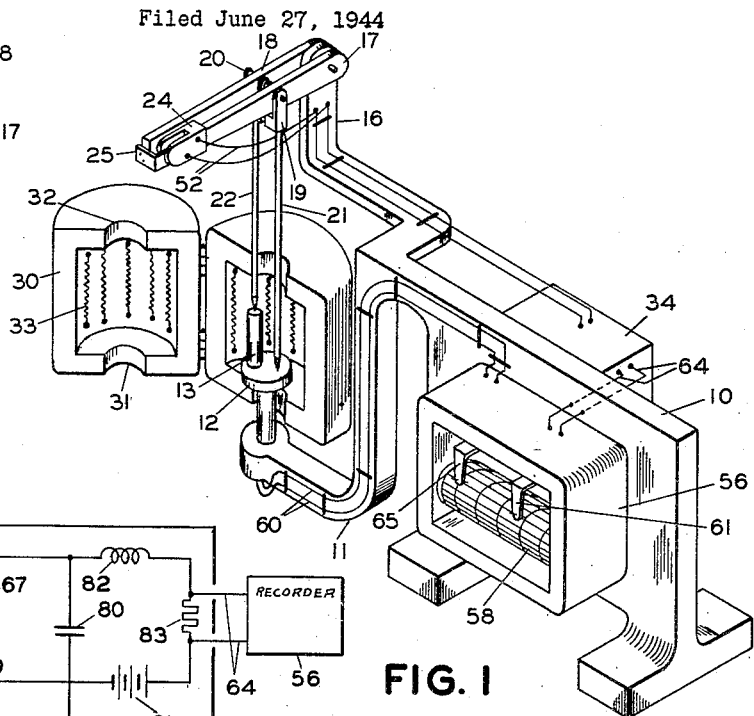
Fig. 1 is a perspective view of a dilatometer embodying the invention.
Figure 4:
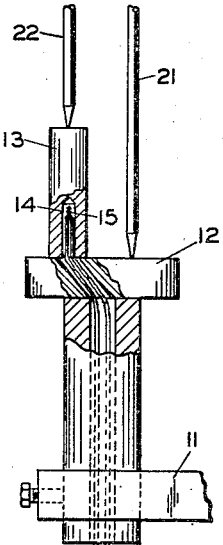
Fig. 4 is a side elevation, partly in section, of certain mechanical details of the dilatometer.

Referring now to the drawings:

A mounting base 10 includes a downwardly extending bracket portion or "gooseneck" 11, supporting a pedestal 12 adapted to form a support and abutment for a specimen 13 of solid material whose dimensional changes under conditions of controlled temperature are to be investigated. The specimen 13 is shaped to a cylindrical or prismatic conformation, cut to a suitable length, and adapted to be placed vertically upon the pedestal 12. Further, as will be understood by reference to Fig. 4, the specimen is provided with an internally bored cavity 14, adapted to enclose a thermocouple 15, whereby the temperature of said specimen may be determined.

Pivotally supported upon the extremity of an extended bracket portion 16 forming a part of the base 10, and adapted for angular deflection through limited angle about a common axis, are two substantially parallel horizontally extended lever arms 17 and 18, passing through a position vertically above the pedestal 12, and having their respective extremities mutually juxtaposed and extending substantially beyond said position in a direction away from their common axis. Pivotally attached to the arms 17 and 18 respectively with axes of rotation parallel to, and equidistant from, the common axis of said arms, and vertically above the pedestal 12, are yokes 19 and 20. Attached to the yoke 19 is a downwardly extending rod 21 of quartz or like heat-resistant material having a negligible temperature coefficient of expansion, the lower end of said rod being preferably reduced in section to provide a substantially point contact, and resting upon the pedestal 12 beside the test specimen 13. Attached to the yoke 20 is a downwardly extending rod 22, similar to the rod 21, but of shorter extent, adapted to rest upon the upper end of the test specimen 13, the relative lengths of the rods 21 and 22 being such that when resting upon the pedestal and the specimen respectively, as hereinabove set forth, the respective axes of the yokes 19 and 20 in the arms 17 and 18 will lie substantially in a straight line, with said arms in a horizontal disposition.

The rods 21 and 22, being formed of material having a negligible expansion with temperature changes, will not change in length sufficiently to cause motion of the arms 17 and 18 respectively when exposed to variable temperature conditions within the oven 30. Dimensional changes of the pedestal 12 or of the gooseneck 11 or of the bracket 16, or of any other part of the mechanism, if reacting upon the arms 17 and 18, will in all cases tend to affect both arms equally, so that, even though they may be angularly deflected about their common axis, their displacements will be through equal angles, with a lack of consequent relative motion between the control couple elements 24, 25 carried on the extremities of the respective arms. Any change in the linear dimension of the specimen 13, however, will act through the rod 22 to affect the arm 18 only, whereby the latter will be displaced with respect to the position of the arm 17, with a consequent variation in the relative position of said control couple elements; and it is this variation only which it is desired to measure.

Carried by the extended portions of the arms 17 and 18, respectively, are the two elements 24 and 25 of a control couple adapted to provide a quantitative response dependent in magnitude upon the relative displacement of said elements. In the adaptation of the principles of the device to use with an electronic network the element 24 may, as shown in Fig. 2, take the form of a pair of juxtaposed coils 26 supported in an insulating mounting 27, and having between them a narrow gap in which may freely pass the element 25 in the form of a thin vane or plate of conducting material. In this form of control couple, the mutual inductance or inductance coupling of the two coils 26 will vary in accordance with the relative position of the elements; and this variation may be utilized to produce a change in the current flow in an electronic network according to any one of a number of methods, one of which will presently be described.

The pedestal 12, together with the specimen 13 under test and the lower ends of the rods 21 and 22, is enclosed in a heating furnace 30 of hinged constructions, having openings 31 and 32 in its lower and upper portions, whereby, when said furnace is closed there is provided a free passage for the pedestal below and the rods above without physical contact between said parts and the furnace walls. Within the furnace is mounted a group of electrical heating units 33 adapted to be supplied with current from a source not shown in the drawings, whereby the specimen 13 may be brought to any desired temperature. The hinged construction of the furnace permits it to be opened and withdrawn at the termination of a heating interval, providing for cooling of the specimen, which, if desired, may be greatly accelerated by elevating about the specimen, together with the pedestal 12 and the gooseneck 11, a quenching tank, not shown in the drawing, but equivalent in all respects to that disclosed and set forth in said Wetherbee application Serial No. 436,678, or, in more detail in the hereinbefore mentioned Rockwell patent.

The electronic network which has been selected as best exemplifying the principles of the invention embodies a vacuum tube oscillator circuit of the tuned-grid-tuned-plate type. Attached to the grid coil of the oscillator is a series tuned linked circuit sensitive to the control couple response to dimensional changes in the specimen under test, whereby said changes may cause representative variations in a measurable electrical magnitude in said network. This network will best be understood by reference to Fig. 5.

The oscillatory system, which may be contained within a suitable enclosure 34, includes an electronic-discharge device such as a four-element thermionic tube 35 having a cathode 36 adapted to be heated by a filament 37 (energized from an external source not shown in the drawing), a grid 38, an anode or plate 39, and a screen grid 40. Connected between the plates 39 and the cathode 36 is a first resonant system, comprising an inductive winding 41 and an adjustable capacitor 42, and a battery 43 for maintaining a suitable potential between the anode and the cathode, together with a resistor 44 of predetermined and fixed value in series with the plate and the battery. Connected between the grid 38 and the cathode 36 is a second resonant system, comprising an inductive winding 45 and an adjustable capacitor 46, whereby said second system may be tuned to resonance with said first system. The inductive windings 41 and 45 are juxtaposed in a manner to provide between them a certain degree of coupling, whereby there may be established a feedback condition between the input and output circuits of the tube 35. A capacitor 47, connected between the second resonant system and the grid 38, acting in conjunction with resistor 49 connected between said grid and the cathode 36, serves, once oscillation is established, to maintain a suitable potential bias between said grid and cathode; and, by making the capacitor 47 variable the degree of feedback may be rendered adjustable.

By connecting the screen grid 40 to a selected tap on the battery 43, said grid is maintained at a potential with respect to other elements of the tube whereby, according to well-known principles of such circuits, the efficiency of operation is greatly increased. Bypass condensers 50 and 51, connected from the cathode 36 to the plate 39 and the screen grid 40 respectively, provide paths for the oscillatory components of currents in corresponding circuit elements, while maintaining said plate and screen grid in proper unidirectional potential relationship to other parts of the tube and associated network.

The coils 26 of the control couple are connected through flexible leads 52 in series with a suitable capacitor 53 across a portion of the inductive winding to form a resonant loop or link having relatively low impedance value which may be varied through a considerable range in accordance with the extent to which the vane 25 lies in the common field of said coils. If these coils are tuned to resonance with the natural period of the system when the vane is in their common field, withdrawal of said vane will then tend to inhibit oscillation; and, as will be readily understood, by suitably selecting and adjusting elements of the network, conditions may be rendered such that under an appreciable range of relative displacement between the vane and the associated coils the degree of oscillation of the system, and hence the magnitude of the current flowing in the plate circuit, will be a definite function of said displacement.

A preferred form of recording unit adapted to the purposes of the invention comprises an instrument mounting 56 having journalled therein a cylindrical drum 57 adapted to carry a record chart 58, and to be angularly rotated about its axis to an extent proportional to the change in temperature of the specimen 13. Rotation of the drum 57 is effected by means of a servomotor element 59 which may be in the form of a self-balancing potentiometer mechanism similar to that fully described and set forth in U. S. Letters Patent No. 2,320,066 granted to F. B. Bristol, May 25, 1943, and adapted to position said drum in an angular sense in response to the electromotive force developed by the thermocouple 15 within the specimen 13, and connected to said mechanism by means of suitable conductors 60. The angular deflection of the drum 57 thus becomes a measure of the temperature of the specimen 13, whereby is established one of the coordinates of the record chart 58.

Juxtaposed to the drum 57 and arranged for translation parallel to the axis thereof is a pen or stylus element 61 adapted to inscribe a graph on the chart 58. Translation of the stylus element is effected by means of a lead screw 62 rotated by a servomotor mechanism 63, similar in all respects to the mechanism 59, and incorporating a self-balancing potentiometer element adapted to respond to unidirectional potential difference existing across the terminals of the resistor 44 to which it is connected by means of conductors 64. The angular rotation of the screw 62, and hence the excursion of the stylus element 61, may thus be made a measure of the magnitude of direct current flowing in the resistor 44, and therefore of the relative position of the control couple elements carried on the extremities of the arms 17—18, so that there will be inscribed on the chart 58 a graph showing the temperature-dilation relationships of the specimen 13, and similar in all respects to the corresponding chart shown and explained in said copending Wetherbee application Serial No. 486,678.

As in said Wetherbee application, also, there is provided a time recording pen or stylus element 65, adapted to traverse the chart 58 in a sense parallel to the translation of the stylus 61, and to be driven at a constant velocity by means of a timing element 66. There is thus drawn on the chart 58, simultaneously with the characteristic curve of the material of the specimen under test, a further record showing the relation existing between elapsed time and the elements of said curve.

Figure 5:
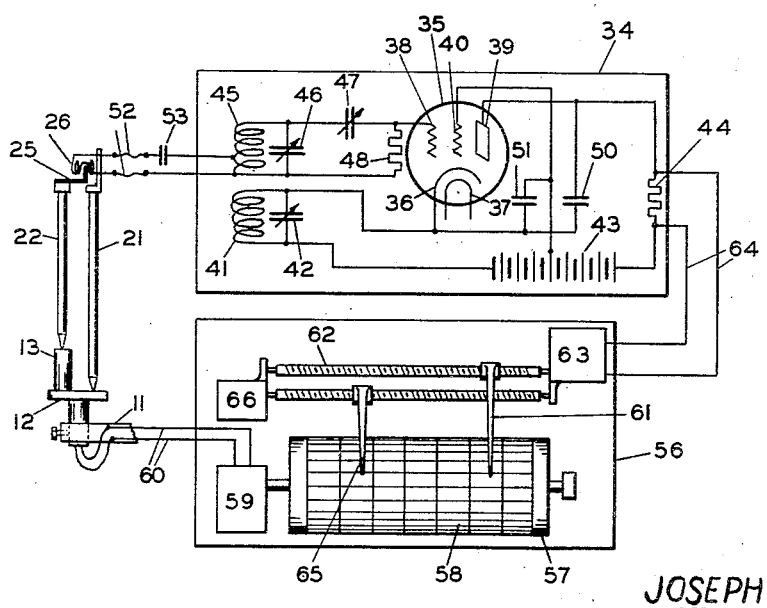
Fig. 5 is a diagrammatic representation showing the dilatometer of Fig. 1 in combination with an alternative form of electronic system.

The oscillation system within the enclosure 34 may, of course, take any convenient form. As an example of a suitable alternative to that shown in Fig. 5, there may be utilized the electronic circuit illustrated in Fig. 3, which comprises a triode 67 having a filament or cathode 69 rendered electron-emissive by means not shown, an anode or plate 70, and a control electrode or grid 71. Connected from the cathode 69 to the grid 71 through a grid leak resistor 74, paralleled by a capacitor 75, is an inductive coil 77 having positioned in mutually inductive relationship therewith a further inductive winding 78. The coils 77 and 78, being suitably designed both with respect to physical dimensions and electrical characteristics, may be made to replace the coils 26 shown in Fig. 2, and thereby to have their inductive coupling varied by movement of the interposed vane 25. One terminal of the coil 78 is connected to that of the coil 77 which leads directly to the cathode 69, and the free terminal of said coil 78 is connected in series with a suitable inductive winding 79 and a capacitor 80 to the plate 70 of the triode 67. Power for the anode circuit is derived from a suitable source, as, for example a battery 81 connected into said circuit in series with an inductive winding 82 and a resistor 83, said resistor corresponding in function to the resistor 44, and across whose terminals may be connected the conductors 64, as shown in Fig. 5, whereby to actuate the instrument 56 in response to the unidirectional component of the output current of the triode 67.

Figure 3:
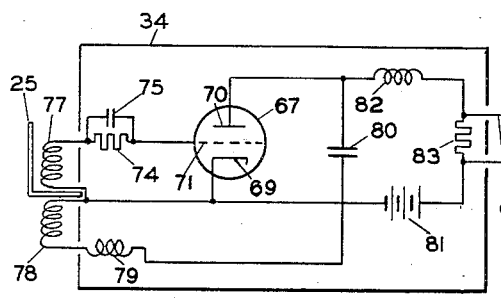
Fig. 3 is a diagrammatic representation of one form of electronic system which may be used with the apparatus shown in Fig. 1.

A system such as is shown in Fig. 3 when suitably proportioned, will constitute an oscillatory circuit of the well-known Hartley class, and would normally oscillate due to feedback between the coils 78 and 79 and coil 77, by means of the inter-electrode capacitance between the input and output circuits of the triode 67 and the capacitor 80 which completes the circuit for the oscillatory current. Oscillation, however, is normally inhibited by the fact of the coils 77 and 78 being disposed with such relative polarity that the interlinkage of their respective magnetic magnetic fields causes degeneration. Interposition of the vane 25 into the common field of said coils will affect their mutual inductance in a sense to inhibit degeneration and allow normal oscillation to take place. By properly proportioning said vane and coils, the degree of oscillation may be caused to vary over a considerable range of motion of said vane with respect to said coils. Thus, the current in the resistor 83, and hence the potential applied to the actuating element of the instrument 56, will become a measure of the movement of those elements whose relative displacement it is desired to record.

The terms and expressions which I have employed are used as terms of description and not of limitation, and I have no intention, in the use of such terms and expressions, of excluding any

I claim:

1. In a dilatometer having a heating furnace, a supporting member projecting from outside the furnace to a position therein without touching the furnace and adapted to support within the furnace a specimen to be tested, an exhibiting instrument, an element adapted to abut said specimen and extending outside said furnace, an element abutting said support and extending outside said furnace, an inductive winding connected with one of said elements for movement therewith, a conducting vane connected with the other of the said elements for movement in the field of the first mentioned element, an electronic system sensitive to changes in the effective inductance of said winding, and electrical means responsive to conditions in said system for controlling operation of said instrument to provide a measure of the relative displacement of said winding and said vane.

2. In a dilatometer having a heating furnace, a supporting member projecting from outside the furnace to a position therein without touching the furnace and adapted to support within the furnace a specimen to be tested, an exhibiting instrument, an element adapted to abut said specimen and extending outside said furnace, an element abutting said support and extending outside said furnace, electronic means including an output circuit connected to said instrument for controlling the operation of the latter, and means comprising cooperating control members operated by the respective elements and free from mechanical interconnection with each other for varying the magnitude of said output current in accordance with the extent of the relative displacements of said control members.

3. In a dilatometer having a heating furnace, means in said furnace adapted to support a specimen to be tested, means responsive to dimensional changes in said specimen, means mechanically distinct from said supporting means but engaging the same to respond to dimensional changes therein, recording means, an electrical reactance element operable by one of said responsive means, an electrical reactance element operable by the other of said responsive means and mechanically separate from the first element but movable in the field of said first element, and oscillatory electronic means controlled by the joint influence of said reactance elements for controlling operation of said recording means through an extent representative only of a change in a dimension of said specimen.

4. In a dilatometer having a heating furnace, means in said furnace adapted to support a specimen to be tested, recording means, an element responsive to displacement of said specimen and to dimensional changes therein, an element responsive to displacement of said supporting means, an electrical reactance member movable by one of said elements, a member unconnected mechanically with the first member but movable by the other of said elements in the field of said first member to vary the reactance thereof, and means responsive to variations in electrical reactance pursuant to relative displacements of said members for controlling said recording means.

5. In a dilatometer having a heating furnace, means in said furnace adapted to support a specimen to be tested, recording means, an element responsive to displacement of said specimen and to dimensional changes therein, an element responsive to displacement of said supporting means, an inductance member movable by one of said elements, a member unconnected mechanically with the first-mentioned member but movable by the other of said elements in the field of said first-mentioned member to vary the inductance thereof, and electronic means responsive to variations in said inductance pursuant to relative movement of said elements for controlling said recording means.

6. In a dilatometer having a heating furnace, means in said furnace adapted to support a specimen to be tested, an element responsive to displacement of said specimen and to dimensional changes therein, an element responsive to displacement of said supporting means, an electron discharge device provided with an oscillation circuit and with an output circuit, an electrical reactance member connected to said oscillation circuit and movable by one of said elements, a member unconnected mechanically with the first-mentioned member but movable in the field thereof by the other of said elements to vary the reactance of said first-mentioned member and thus the degree of oscillation of said oscillation circuit for controlling the magnitude of current flowing in said output circuit, and recording means responsive to said current.

JOSEPH W. PECKHAM.

REFERENCES CITED

The following references are of record in the file of this patent:

UNITED STATES PATENTS

| Number | Name | Date |
|---|---|---|
| 1,815,717 | Kranz | July 21, 1931 |
| 1,905,607 | Sato | Apr. 25, 1933 |
| 1,955,315 | Styer | Apr. 17, 1934 |
| 2,025,719 | Blau | Dec. 31, 1935 |
| 2,279,368 | Dietert | Apr. 14, 1942 |
| 2,290,868 | Eriksson | July 28, 1942 |
| 2,351,572 | Kingston | June 13, 1944 |
| 2,358,103 | Ryder | Sept. 12, 1944 |
| 2,371,040 | Fisher et al. | Mar. 6, 1945 |
| 2,380,565 | Wetherbee | July 31, 1945 |